United States Patent [19]
Yates

[11] Patent Number: 6,027,166
[45] Date of Patent: Feb. 22, 2000

[54] BICYCLE SADDLE WITH ADJUSTABLE CUSHIONING

[76] Inventor: Paul M. Yates, 5814 Briar Tree Dr., LaCanada, Calif. 91011

[21] Appl. No.: 09/247,290

[22] Filed: Feb. 9, 1999

Related U.S. Application Data

[62] Division of application No. 09/148,447, Sep. 4, 1998.
[51] Int. Cl.⁷ ........................................................ B60N 2/38
[52] U.S. Cl. .................................. 297/195.1; 297/228.12; 297/219.11
[58] Field of Search ........................... 297/228.12, 219.11, 297/195.1, 452.27, 284.1, 284.3, 452.48, 452.55

[56] References Cited

U.S. PATENT DOCUMENTS 3,514,156  5/1970  Fields .
3,612,607  10/1971  Lohr .
4,403,356  9/1983  Urai .
5,108,076  4/1992  Chiarella .
5,356,205  10/1994  Calvert et al. .

FOREIGN PATENT DOCUMENTS

94/08839  4/1994  WIPO ................................ 297/219.11

*Primary Examiner*—Milton Nelson, Jr.
*Attorney, Agent, or Firm*—Walter A. Hackler

[57] ABSTRACT

A bicycle saddle with adjustable cushion includes a bicycle saddle shell and a fabric/film covering attached to a perimeter of the shell. A plurality of elastomers are disposed between the fabric/film and the shell. One of the plurality of elastomers has a plurality of cavities and another of the plurality of elastomers has a plurality of projections. The cavities and projections are sized and spaced apart from one another to enable selected engagement therebetween in order to provide customized resilient properties of the saddle and indexing of the elastomers.

14 Claims, 7 Drawing Sheets

_FIG. 8._

_FIG. 9._

_FIG. 10._

BICYCLE SADDLE WITH ADJUSTABLE CUSHIONING

This is a divisional of U.S. patent application Ser. No. 09/148,447 filed on Sep. 4, 1998.

The present invention is generally directed to the field of saddles or seats for bicycles and the like and is more particularly directed to a bicycle saddle in which the cushioning, or resiliency, thereof can be altered or changed by a rider.

A bicycle saddle is, by its very nature, a personal item, and consequently, there are no one-size-fits-all bicycle saddles. In addition to initial comfort, a bicycle saddle, when used over an extended period of time, may become increasingly uncomfortable.

Heretofore, no bicycle saddles have offered a customized cushioning which is selectable by the rider. In addition, no saddles heretofore made enable the rider to adjust the cushioning during the course of a trip.

While a number of suspension systems have been developed which offer adjustability, these systems do not enable the rider to not only change the cushioning, or resiliency of the cushion itself but, in addition, enable the rider to customize the shape of the cushion, depending upon the circumstances or individual desires of a rider. The present invention provides for a saddle which, in effect, can be shaped by the user at any time through the use of insert pads.

SUMMARY OF THE INVENTION

A bicycle saddle in accordance with the present invention generally includes a bicycle saddle shell, a fabric/film covering attached to a perimeter of the bicycle saddle shell and an elastomeric cushion disposed between the shell and the fabric/film.

The cushion may comprise a first elastomer and a second elastomer, one of the first and second elastomers having a plurality of cavities and another of the first and second elastomers having a plurality of projections, the cavities and projections being sized and spaced apart from one another to enable engagement therebetween.

In one embodiment of the present invention, the fabric/film covering may include means for enabling placement of and removal of the first and second elastomers between said fabric/film and said shell. Alternatively, the first elastomer may be attached to the fabric/film with only the second elastomer being removably placed between said fabric/film and said shell.

Yet another embodiment of a bicycle saddle, in accordance with the present invention, generally includes a bicycle saddle shell and a fabric/film covering which is attached to a perimeter of the shell. At least one cushion pad is provided and means, defining an opening in the fabric/film, is provided for enabling placement and removal of the pad between the fabric/film and the shell in order to not only change the saddle resiliency, but also contour of the saddle as may be desired by a rider.

More particularly, an elastomeric layer may be attached or adhered to an underside of the fabric/film in order to provide an additional contour and resiliency to the saddle.

Still more particularly, the elastomeric layer may include means defining a plurality of cavities therein in order to provide an initial variation and resiliency across the saddle.

In accordance with the present invention, the cushion pad may be formed from an elastomeric material, or a foam, which includes a smooth surface means for covering and sealing the cavities in order to form a plurality of pneumatic pistons within the elastomeric layer. In that regard, the cavities may be formed in a spaced apart relationship and of different depths in order to control the cushioning properties of the saddle.

Further, the cushion pad may be made in various shapes which enable the rider to customize not only the resiliency, but the contour of the saddle at any time. By providing a plurality of cushion pads in accordance with the present invention, the rider/user thereof has the opportunity to custom tailor not only the resiliency of the saddle, but also its contour according to the needs and desires of the rider/user.

A bicycle saddle in accordance with the present invention may be produced by the steps of providing a bicycle saddle shell and a fabric/film having a selected perimeter contour. An insertable elastic pad is provided and an opening is formed in the fabric/film for enabling placement and removal of the pad between the fabric/film and the shell.

The fabric/film is disposed into a mold with the fabric/film perimeter surrounding a mold cavity, with a cavity having an initial bicycle saddle contour.

A polymer is disposed in the mold cavity and onto the fabric/film and the fabric/film is contoured to the mold cavity with heated polymer in order to form a shaped elastomer adhering to the fabric/film. This shaped elastomer provides an initial permanent contour to the fabric/film in the shape of the bicycle saddle.

The contoured fabric/film is wrapped over the shell and adhered to an underside of the shell with the fabric/film opening disposed over the top of the shell. Thereafter, the elastic pad is inserted between the fabric/film and the shell.

More particularly, the saddle may be produced including the steps of forming a plurality of spaced apart open ended cavities in the shape of the elastomer and sealing the open ended cavities with the elastic pad in order to form the sealed air columns within the shaped elastomer.

As hereinabove noted, the bicycle saddle in accordance with the present invention may utilize the steps forming the plurality of cavities of different depths and of various spacing in order to control the cushioning properties of the saddle. In addition, the plurality of elastomeric pads may be provided for subsequent control of saddle resiliency and contour.

In still another embodiment of the present invention, the fabric/film covering may be unattached or partially attached to the shell and a drawstring provided in order to cinch the covering around the shell. In this embodiment the covering may be removed from the shell or partially laid open in order for a user to change elastomer pads/cushions as hereinabove and hereinafter described.

BRIEF DESCRIPTION OF THE DRAWINGS

The advantages and features of the present invention will be better understood by the following description when considered in conjunction with the accompanying drawings, in which.

DETAILED DESCRIPTION

Figure 1:
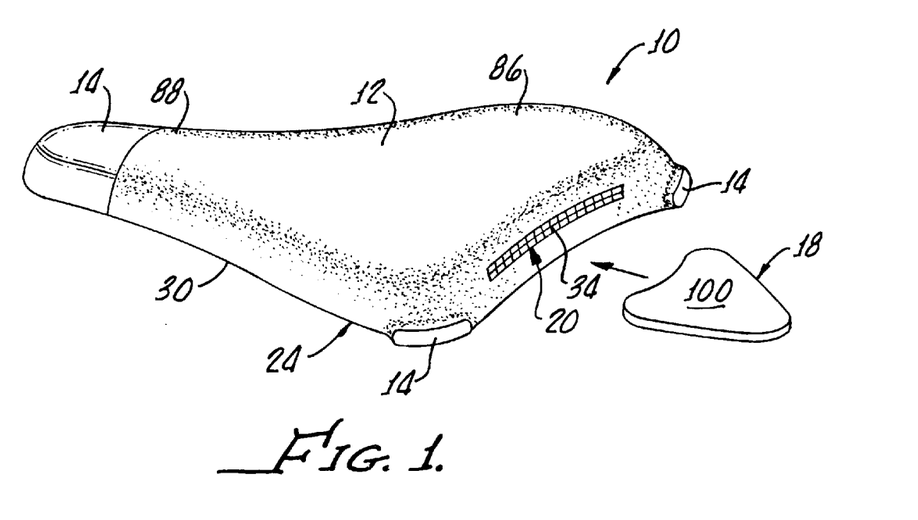
FIG. 1 is a perspective view of a saddle made in accordance with the present invention generally showing a fabric/film conforming to a saddle shell, with the fabric/film having an opening therein for enabling the placement and removal of a cushion pad between the fabric/film and the shell in order to change the saddle resiliency and contour.

With reference to FIG. 1, there is shown a bicycle saddle 10 in accordance with the present invention and made in accordance with the method of the present invention which generally shows a fabric/film cover 12 overlaid with a plurality of scuff pads 14. A representative cushion pad 18 and importantly, an opening 20 may be provided in the fabric/film 12 for enabling placement and removal of the pad 18 between the fabric/film 12 and an underlying shell 24.

Figure 2:
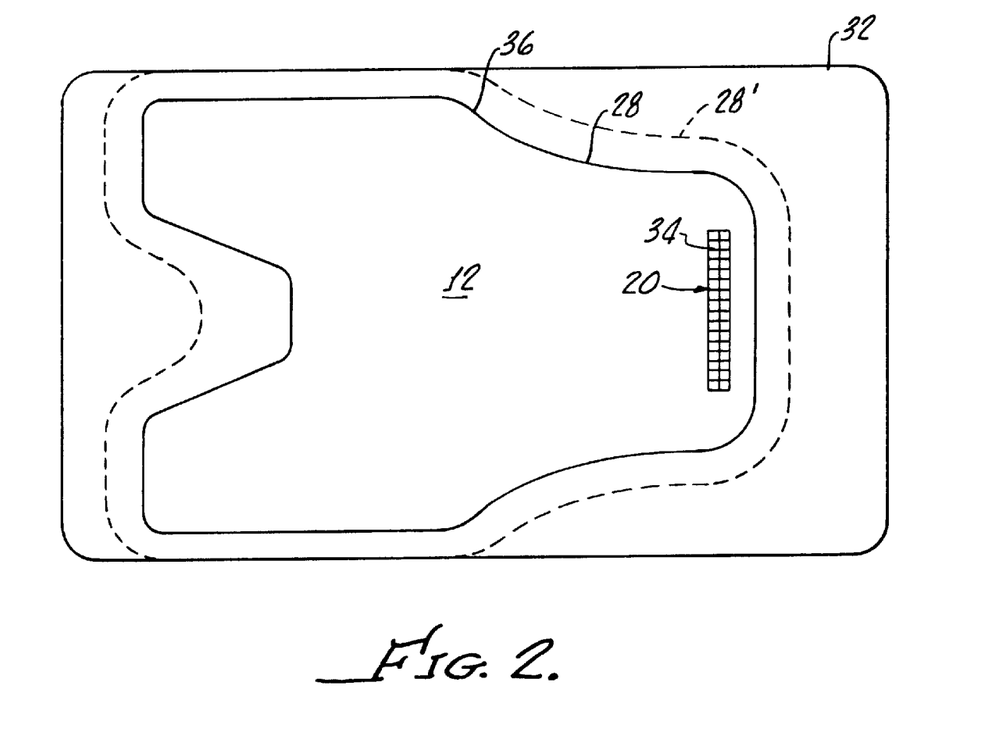
FIG. 2 is a plan view of the fabric/film overlaid by a plastic film which enables the placement of scuffed pads on the finished saddle.

The fabric/film 12 may be of any suitable fabric such as Lycra®, or a plastic material having a selected perimeter 28 (see FIG. 2). It should be appreciated that the perimeter 28 shown in FIG. 2 is only representative. This perimeter 28 may be trimmed subsequent to forming, or may be precut, in order to conform to a perimeter 30 of the saddle 10 (see FIG. 1).

Turning again to FIG. 2, the fabric/film 12 may be overlaid by a plastic, for example, urethane film 32 having a cutout 36 therein which is heat sealed to the fabric/film 12.

The heat sealing may be done in a conventional manner using a flat press (not shown) as is well known in the art. The plastic film may be of any suitable urethane or polyurethane with a thickness of between about 0.001 inches and about 0.5 inches, depending upon the desired stiffness and texture present in the scuff pads 14.

A thinner urethane film produces less abrasive resistance in the scuff pads 14, however, enables a color sheeting of the fabric/film 12 for decorative purposes on the saddle 10. A thicker urethane film provides more durable abrasion resistance for the scuff pads 14 and also more color contrast distinction between the abrasive resistant scuff pads 14 and the fabric/film 12.

The opening 20 in the fabric/film 12 may be formed in any conventional manner, for example, a slitting of the fabric and the insertion of a zipper 34 or the like. It should be appreciated that a Velcro® system may be utilized in lieu of a zipper arrangement. Further details regarding the plastic film 32 utilized for forming the scuff pads 14 may be found in companion U.S. patent application Ser. No. 09/137,986 entitled, BICYCLE SADDLE PRODUCTION METHOD, filed on Aug. 21, 1998, which is to be incorporated herewith in its entirety, for not only teaching the application of scuff pads but for the general production methods utilized in the manufacture of a bicycle saddle 10 in accordance with the present invention.

The cushion pad 18 may be formed from any suitable elastomeric material gel, or foam, and importantly may be shaped in various contours, only one being shown in FIG. 1, to enable shaping or confirmation of the saddle 10 to suit individual preferences as hereinbefore described. The selection of material, i.e., gel or foam, provides one means for controlling resiliency of the saddle 10. As also shown in FIG. 2, various perimeters 28' may be utilized depending upon the saddle shape and stretchability or resiliency of the fabric/film 12 for fitting on a saddle shell.

Figure 3:
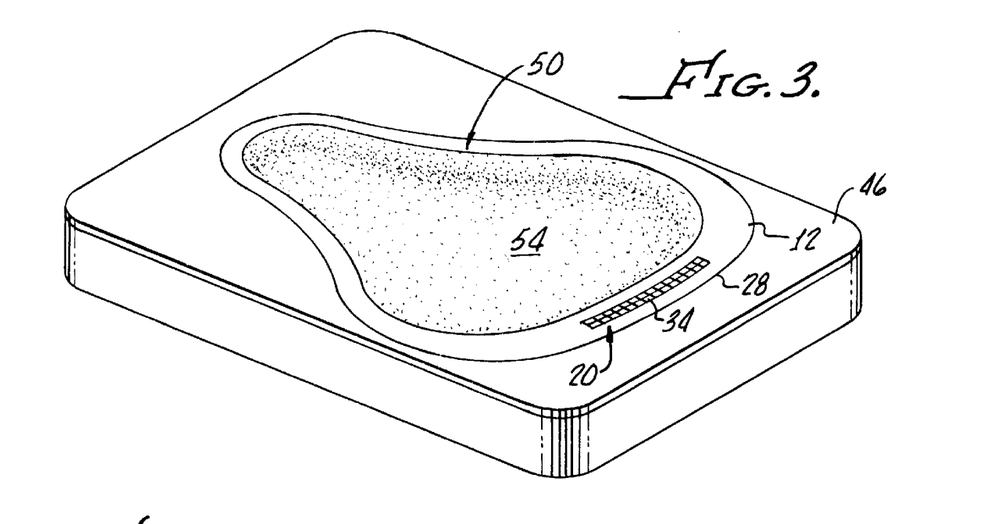
FIG. 3 is a perspective view of the fabric/film shown in FIG. 2 as it may be inverted and covered with a gelable polymer.
Figure 4:
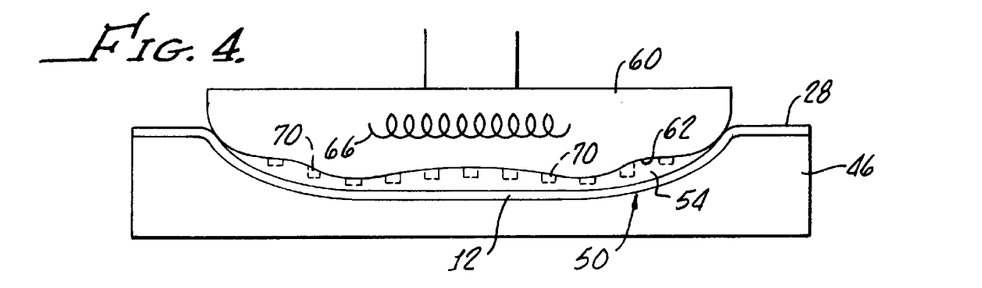
FIG. 4 is a cross sectional view of the fabric/film shown in FIG. 3 as it may be disposed in a mold in accordance with one embodiment of the present invention and conformed thereto by heated fixture having pins therein for providing cavities in a shaped elastomer adhering to the fabric.
Figure 5:
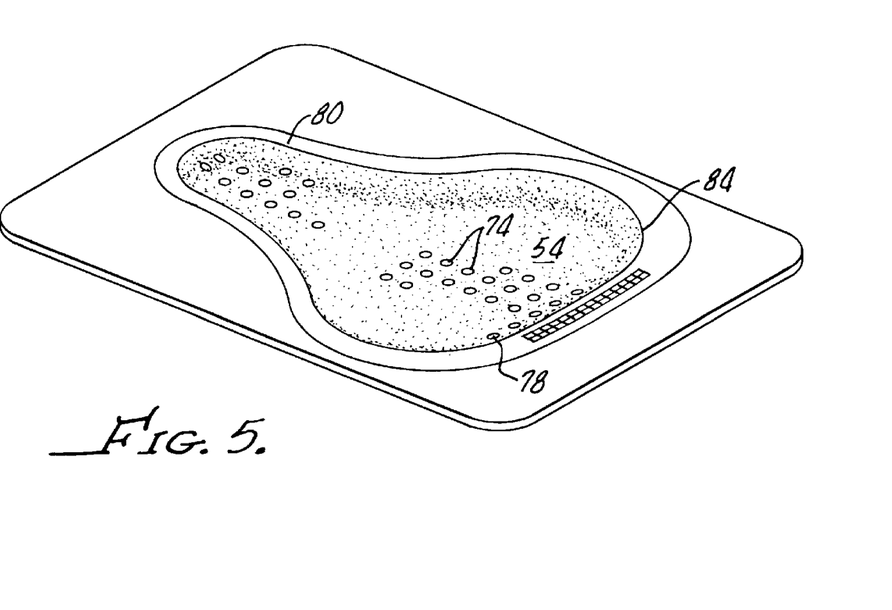
FIG. 5 is a perspective view similar to FIG. 4 showing the fabric/film with a shaped elastomer thereon having a plurality of cavities for controlling the cushioning effect of the elastomer.

With reference to FIG. 3, the fabric/film 12 is inverted and disposed in a mold 46 with the fabric/film 12 perimeter 28, surrounding a mold cavity 50, as more clearly shown in FIG. 4. A gelable polymer 54 is disposed into the mold cavity 50 and on to the fabric/film 12 and thereafter the fabric/film 12 is conformed to the mold cavity 50 utilizing a fixture 60 having a contoured face 62. The polymer 54 is heated, for example, by a coil 66 and a fixture 60 or in the conventional manner in order to form a shaped elastomer adhering to the fabric/film 12. Because of such adherence, the contour of the fabric/film 12 is permanently in the shape of the bicycle saddle contour.

The gelable polymer 54 may be of any suitable type such as, for example, set forth in U.S. Pat. No. 5,633,286, which is incorporated into the present application by this specific reference thereto, for describing the types of polymers/elastomers suitable for the present invention. The term elastomer utilized throughout this application is meant to include all materials having elastomer properties, such as, but not limited to, gels and foams.

An important aspect of the present invention includes the utilization of the fixture 60 with a shaped contour 62 and also having a plurality of discrete protrusions, or pins 70, which form a plurality of cavities 74, 78, 80 which are spaced apart from one another.

The contoured surface 62 of the fixture 60 enables not only the formation of shaped elastomer with different thickness, but the formation of cavity 74, having different depths. Thicker elastomer and deeper cavities 78 may be disposed closer to a perimeter 84 of the shaped elastomer 54.

In accordance with the present invention, the shaped elastomer 54 can be made thicker in selected areas, for example, in a seat area 86, and a horn area 88 (see FIG. 1) by the contoured surface 62 of the fixture providing greater space between the fabric/film 12 and the contoured face 62, as shown in FIG. 4.

A variation in cushioning capability of the saddle 10 is provided by the cushion pad 18 which, as hereinabove described, may be of various shapes and thicknesses for enabling individual tailoring of the resiliency and a final contoured shape of the saddle 10 by a user/rider.

Importantly, the cushioning pad 18 is made of a compatible elastomeric material which may include a smooth surface 100 thereon for sealing the cavities 74, 78, 80 in order to form a plurality of pneumatic pistons within the elastomeric layer 54.

It should be appreciated that while only one cushion pad 18 is shown in the Figures, multiple cushion pads may be utilized having various shapes and thicknesses in order to effect the principle of the present invention which is the enablement of providing a tailored resiliency contoured shape of a saddle 10 in accordance with the desires of a user/rider. Importantly, and as can be easily comprehended from FIG. 1, this change of resiliency and contour may be effected by the user/rider at any time through the utilization of a convenient opening 20 with, for example, a zippered closure 34.

As hereinabove noted, when the cavities 74, 78, 80 are sealed, they provide miniature compressible air columns in the elastomer 54. Because these air columns can be of different length, as hereinabove described, with various spacings, the overall cushioning effect of the saddle 10 can be tailored. More specifically, these sealed air columns provide for a pneumatic cushioning hereinbefore not provided by bicycle saddles.

Figure 6:
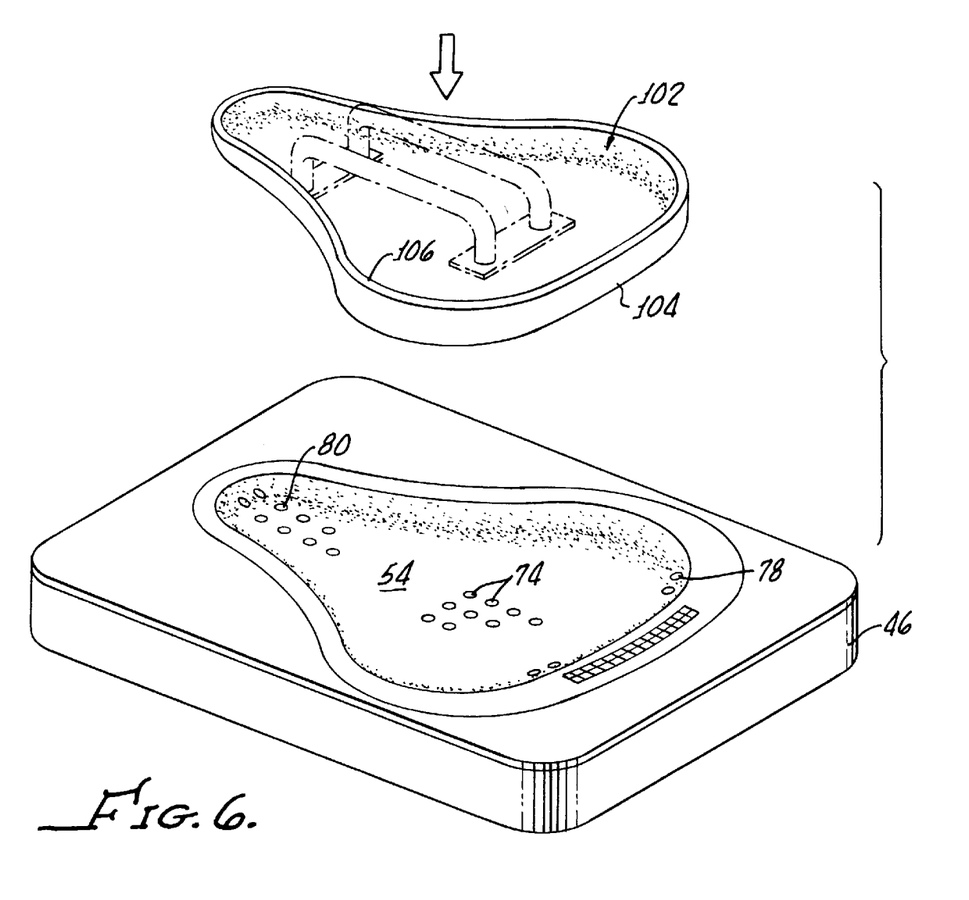
FIG. 6 is a perspective view of the fabric/film with shaped elastomer along with a shell.

With reference to FIG. 6, after removal of the fixture 60, a plastic saddle shell 102 having a surface 104, may be applied against the elastomer 84 residing in the mode 46.

Alternatively, the fabric/film 12, with the elastomer 54 adhered thereto, may be removed from the mold 46 and applied to the shell 102 and wrapped thereabout and attached to an underside perimeter 106.

Figure 7:
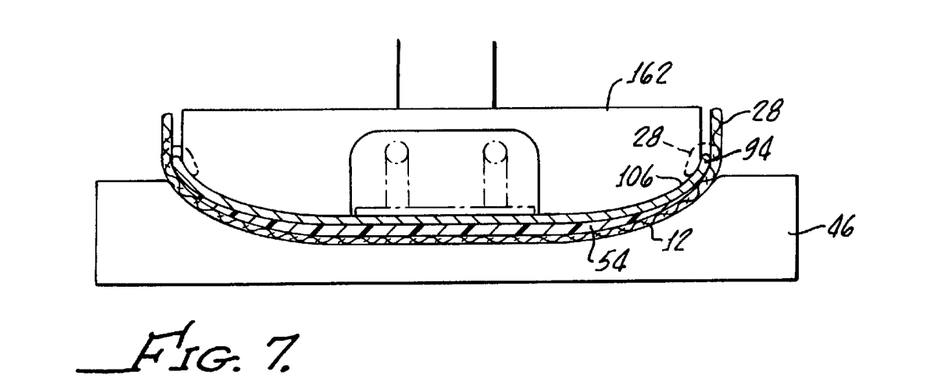
FIG. 7 is a cross sectional view of the mold shown in FIG. 6 showing the fabric/film being wrapped around the shell and bonded to an underside of the shell.

If the mold 46 is utilized, the shell may be forced into the elastomer 54 as shown in FIG. 7, the perimeter 28 being fastened to the underside 106 of the shell 102 as indicated in dashed lines of FIG. 7.

It should also be appreciated that in order to reduce production costs, the fabric/film 12 may be disposed into the mold 46 and the hot polymer elastomer injected thereonto in order to conform the fabric/film 46 to the mold 46. Upon cooling, the shaped elastomer 54 maintains the fabric/film 12 in the conformance of the imparted mold contour.

Figure 8:
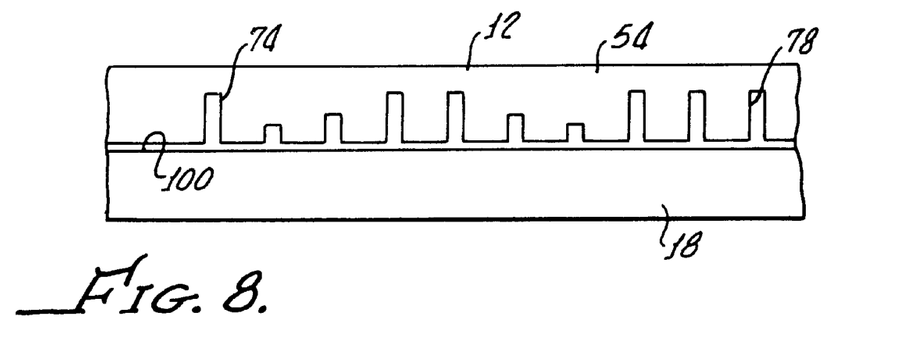
FIG. 8 is a cross section representation of the shown in FIG. 1 with smooth surface sealing cavities in a first elastomer in order to provide sealed cavities with pneumatic properties.

With reference to FIG. 8, the polymer 54 which may be considered a first elastomer is attached to the fabric/film as hereinabove described and the pad 18, which may be considered a second elastomer, having the smooth surface 100, is utilized to seal the cavities 74, 78 as hereinbefore described.

Preferably, the fabric/film 12 is elastic so that after placement of the pad 18, the elastic quality of the fabric/film 12 holds the pad 18 in place which enhances the integrity of the saddle 10 when the opening is closed, i.e., zipped.

Figure 9:
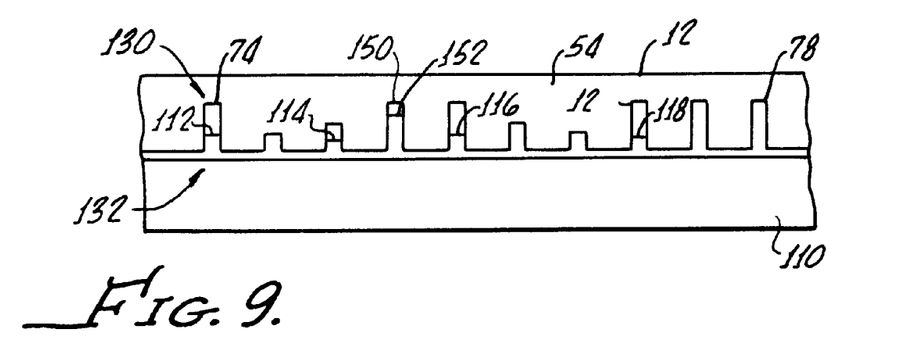
FIG. 9 is a cross section representation of a second elastomer pad having a plurality of projections therein for engaging a plurality of cavities in a first elastomer attached to an underside of the fabric/film shown in FIG. 1.

Alternatively, as shown in FIG. 9, a second elastomer, or pad, 110 may include projections 112, 114, 116, 118, shown solid in the cavities 74, 120, 122, 124, which are sized, shaped and spaced apart from one another to enable engagement with the cavities 74, 118, 120, 122. In effect, an array 130 of cavities 74, 118, 120, 122 and an array 132 of projections 112, 114, 116, 118. Each of the arrays 130, 132 may have a different number of cavities and projections which enable different engagement positions between the first and second elastomers 54, 110. The cavities 74, 120, 122, 124 shown in FIG. 9 may be any shaped cavity such as, for example, a hole or a groove, and the projections 112, 114, 116, 118 may be any shaped projection such as, for example, a pin or a rib.

In this manner the overall resiliency of the saddle 10 may be tailored. As hereinabove noted, the cavities 74, 120, 122, 124 may have different depths and the projections 74, 120, 122, 124 may have different lengths so that complete or partial filling of the cavities 74, 120, 122, 124 may be utilized to further customize the resiliency of the saddle 20.

The resiliency of the saddle 10 may be additionally customized by utilizing elastomers 54, 110 of different durometers.

It should be appreciated that filled cavities 122 will effect different resilient properties in an area therearound than a partially filled cavity 120 or an empty cavity 78. Thus, the cushioning or resilient properties can be modified by different placements of the first and second elastomers 54, 110 with respect to one another. That is, in different placement, different cavities 120, 122 are filled or partially filled by projections 116, 118. In fact, different resilient patterns can be achieved with only two elastomers 54, 110 by different engagement patterns of the arrays 130, 132. Obviously, an indefinite number of resilient patterns of the saddle 10 may be achieved with different elastomers, not shown for clarity, with different arrays, also not shown for sake of clarity.

Another feature of the arrays 130, 132 is the providing of a "locator" for the first and second elastomers 54, 110. In other words, because the cavities 112, 120, 122, 124 and projections 112, 114, 116, 118, only fit, or nest, in one or more selected patterns, the first and second elastomers are indexed, or located, with regard to one another in the selected pattern. This is important for providing the user with a repeatable selection of tailored, or customized, cushioning.

In addition, although only a first and a second elastomer 54, 18 are shown a plurality of elastomers (not shown) may be utilized with the features of the present invention. When additional elastomers (not shown) are utilized, the indexing features of the present invention become more important in initially orienting the elastomers with one another and maintaining the position of the elastomers with one another.

Use of multiple elastomers enables greater lateral movement of the cushion saddle 10, hence, weight and pressure are not as concentrated at a given point when a user is riding. That is, resilient translational shear is provided for rider comfort. This can be further enhanced by using elastomers 54, 110 of different durometers as hereinabove noted.

With reference to FIG. 9, one or more of the cavities 150 may be filled with a foam 152. The foam, which may be urethane, is flexible, thus allowing the cavity 150 to collapse under rider pressure or insertion of a projection (not shown in FIG. 9), yet keeping and maintaining the elastomers 54 shape over a long period of time.

Figure 10:
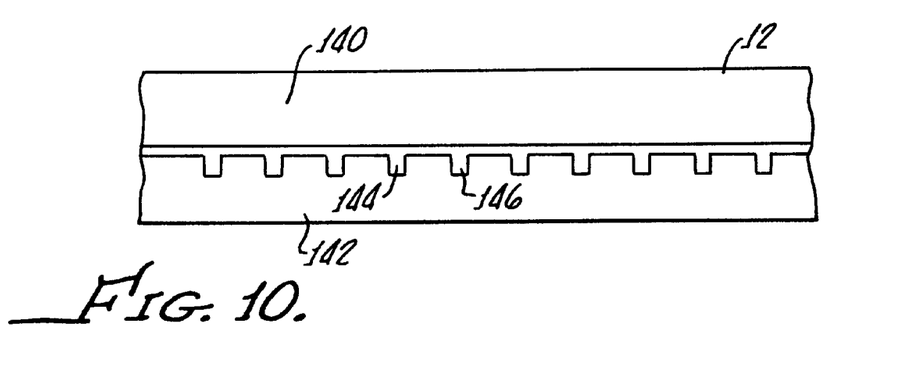
FIG. 10 is a cross section representation of a second elastomer pad having a plurality of cavities therein for engagement of a plurality of projections in a first elastomer attached to an underside of the fabric/film shown in FIG. 1.

As shown in FIG. 10, an alternative embodiment utilizes a first elastomer 140 attached to the fabric/film 12 for engaging a second elastomer 142. In this instance, the first elastomer 140 includes cavities 144 and the second elastomers 142 includes projections 146, shown in solid line. The effects of these cavities 144 and projections 146 are similar to that hereinabove described in connection with FIG. 9.

Figure 11:
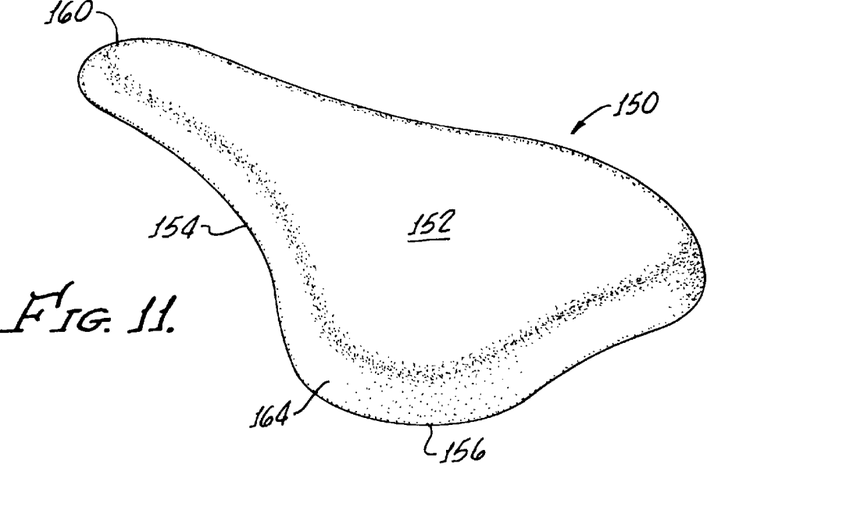
FIG. 11 is a perspective view of another embodiment of the present invention in which a fabric/film covering is cinched to a shell with a drawstring in order to enable insertion and removal of elastomer/foam cushion pads.

With reference now to FIG. 11, there is shown another embodiment of a saddle 150 in accordance with the present invention generally showing a fabric/film covering 152 disposed over a shell 154 and cinched thereto by a drawstring 156.

Figure 12:
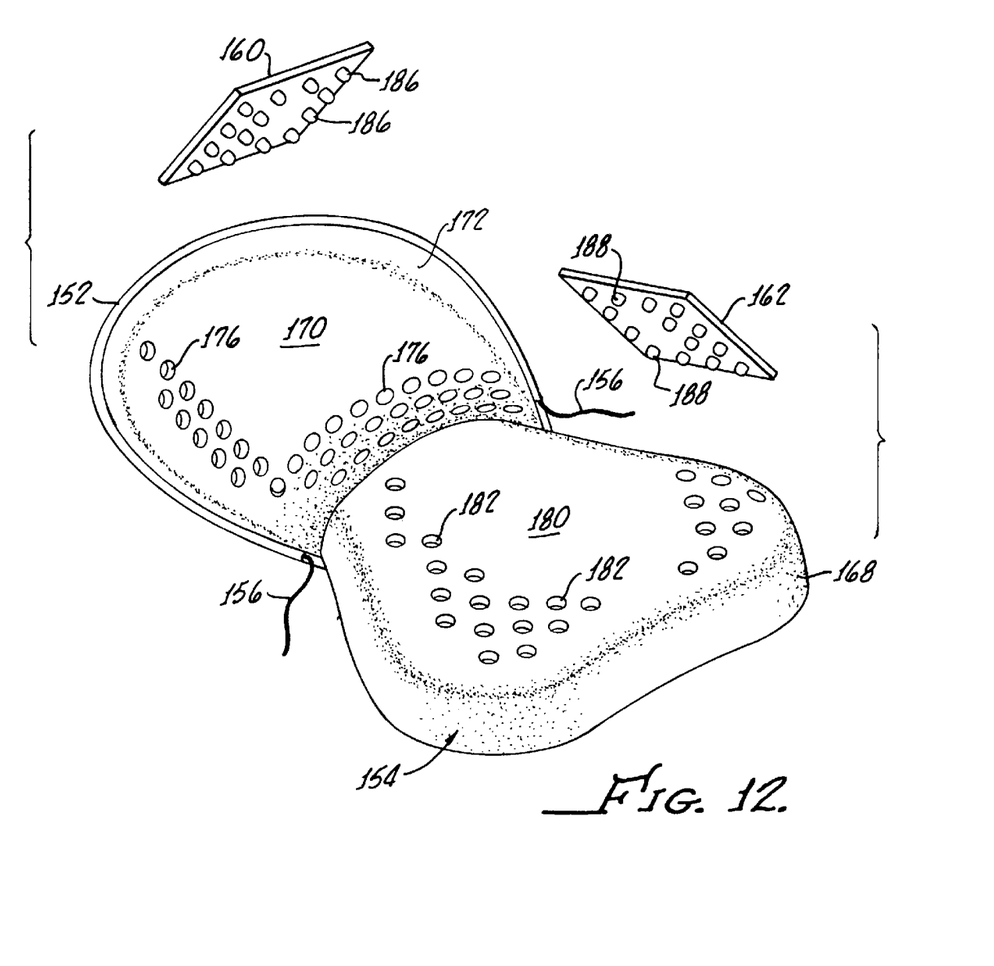
FIG. 12 is a perspective view of the saddle shown in FIG. 11 with the covering laid back for insertion of one or more pads, the pads having projections thereon for engaging cavities in a mating elastomer.

The drawstring 156, when loosened, enables the covering 152 to be pulled, or laid back as shown in FIG. 12 for the insertion of elastomer, or foam, pads 160, 162. The fabric/film 152 may be attached to a horn portion 160 of the shell 154, or completed cinched around the shell 154 by the draw cord 156, which is slidably attached to a perimeter 164 of the fabric/film covering 152 in a conventional manner. As shown, the drawstring, or cord, 156 may be utilized to cinch the fabric/film covering around a tail portion 168 of the shell 154.

A first elastomer 170 may be attached to an underside 172 of the covering 152 as hereinbefore described. The elastomer 170 may be formed with a plurality of cavities 176, also as hereinabove described. A second elastomer 180 may be disposed or attached to the shell 154, with the elastomer 180 being formed with cavities 182.

Pads 160, 162 may be formed with pin-like projections 186, 188 and sized for engagement with the cavities 176, 182. As hereinabove described, the pads 160, 162 may be formed from an elastomer, for example, a gel, or a form, as for example, a urethane foam.

Although two exemplary pads 160, 162 are shown, any number of additional pads, not shown for sake of clarity, may be utilized. As hereinabove described, the various combinations of pads 160, 162 and elastomers 170, 180 provide a modular system for creating a saddle 150 with specific resilient and contour characteristics. Importantly, such characteristics may be altered or modified, by rearrangement of the pads 160, 162 between the elastomers 170, 180, or substitution of auxiliary pads, not shown.

Figure 13:
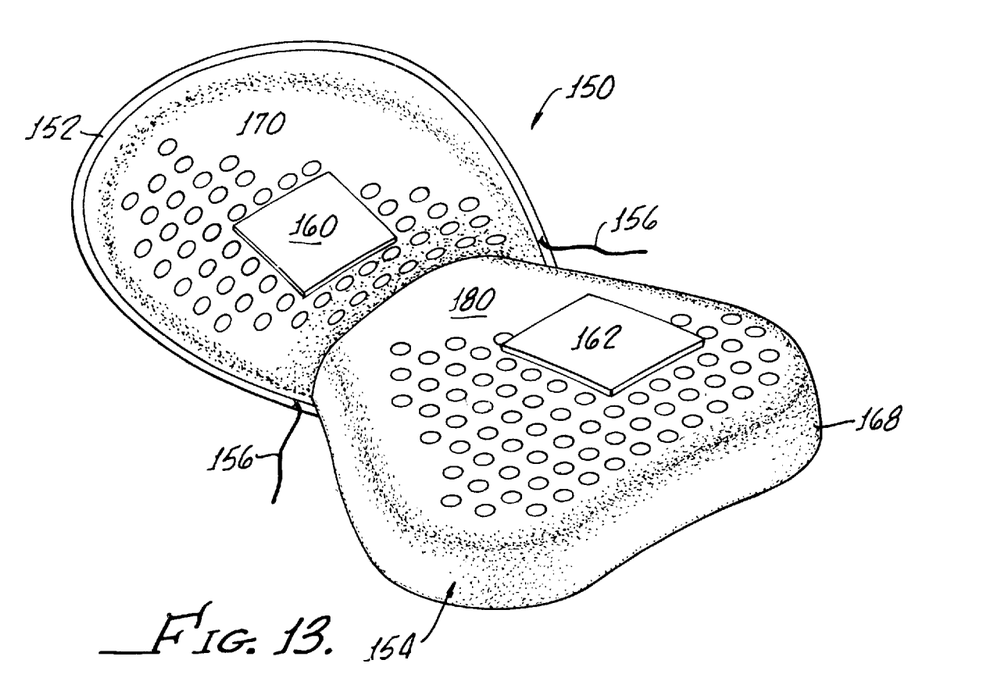
FIG. 13 is a perspective view of the saddle shown in FIG. 12 showing cushion pads as may be place in engagement with one of the elastomer disposed on the shell and another elastomer attached to the covering underside.
Figure 14:
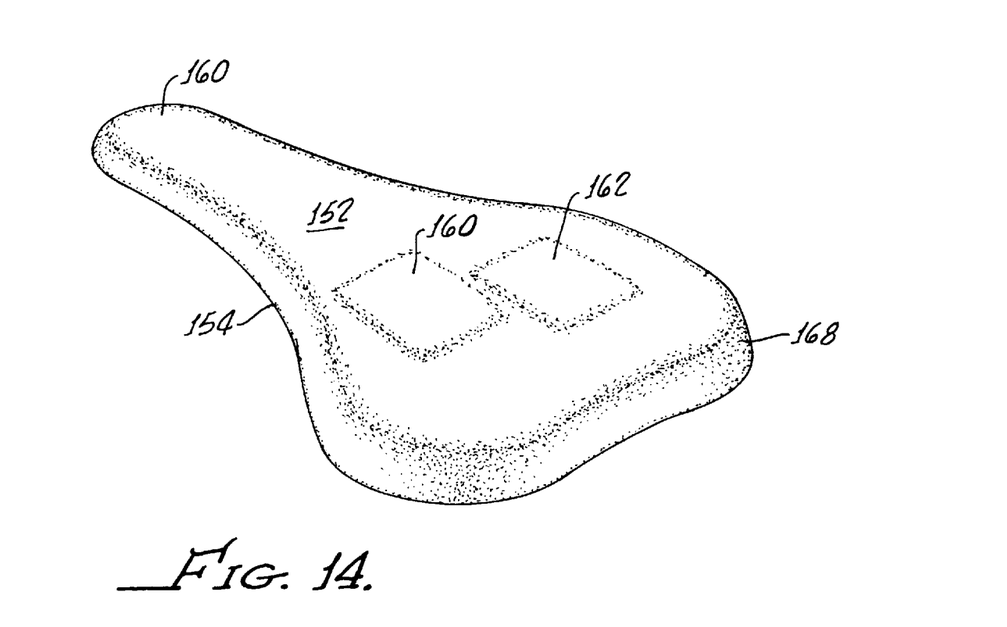
FIG. 14 is a perspective view of the saddle shown in FIG. 13 showing, in dashed line, pads disposed between the covering and the shell.

FIG. 13 shows the pads 160, 162 disposed in an engaging manner with the elastomers 170, 180, respectively, and FIG. 14 shows the covering 152 being cinched over the shell 154 with the pads 160, 162 therebetween.

Of utmost importance is the fact that the cavities 176, 182 and projections 186, 188 engage, which enables placement of the pads 160, 162 between the elastomers 170, 180 without severe, or abrupt, change in the profile or contour of the covering 152. That is, while the elastomeric, or resilient, properties of the saddle may be significantly altered, there are no lumpy areas as would be expected by the insertion of a pad beneath a typical covering, not shown.

Figure 15:
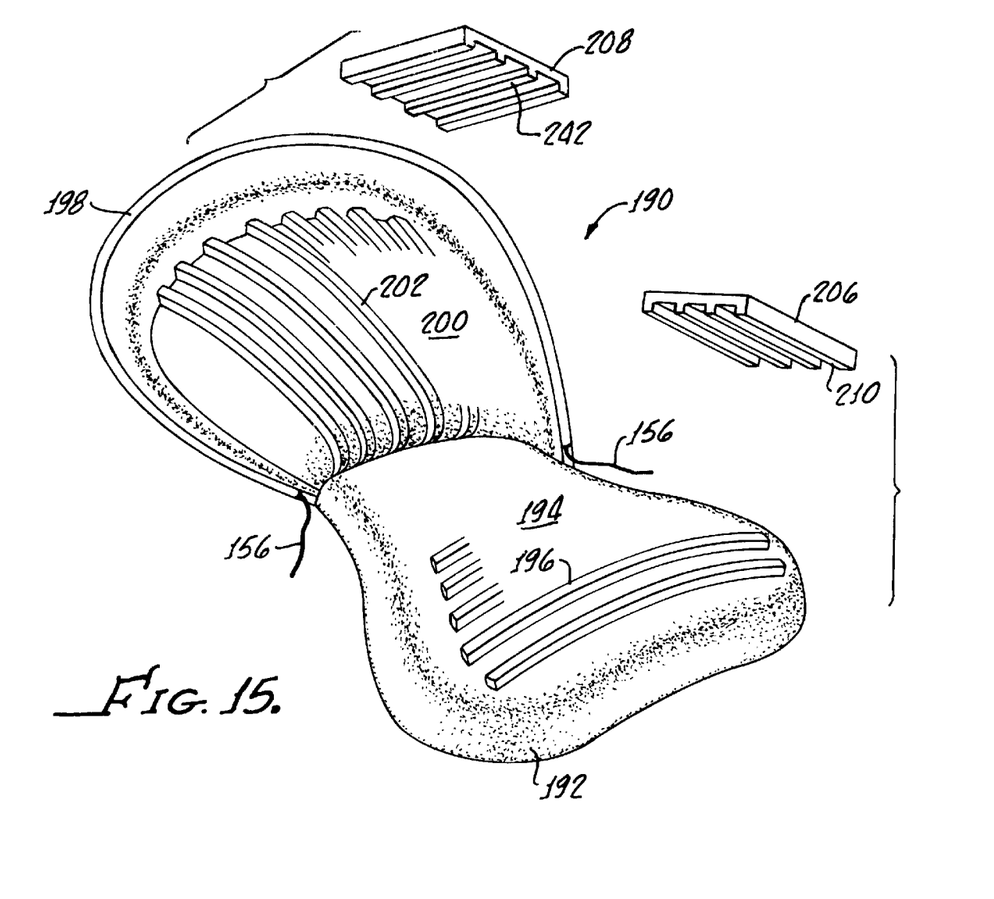
FIG. 15 is a perspective view of yet another embodiment of the present invention in which the cavities are grooves and the projections are ribs.

Yet, another embodiment of a saddle 190 is shown in FIG. 15. This embodiment 190 utilizes a shell 192 having an elastomer 194 disposed thereon, with the elastomer 194 having grooves 196 and a covering 198 also having an elastomer 200 having grooves 202 formed therein.

Correspondingly pads 206, 208 have ribs 210, 212 formed therein for engagement with the grooves 196, 202. Operation and function of the grooves 196, 202 and ribs 210, 212 is similar to that hereinabove described for the embodiment 150 shown in FIGS. 11–14.

Figure 16:
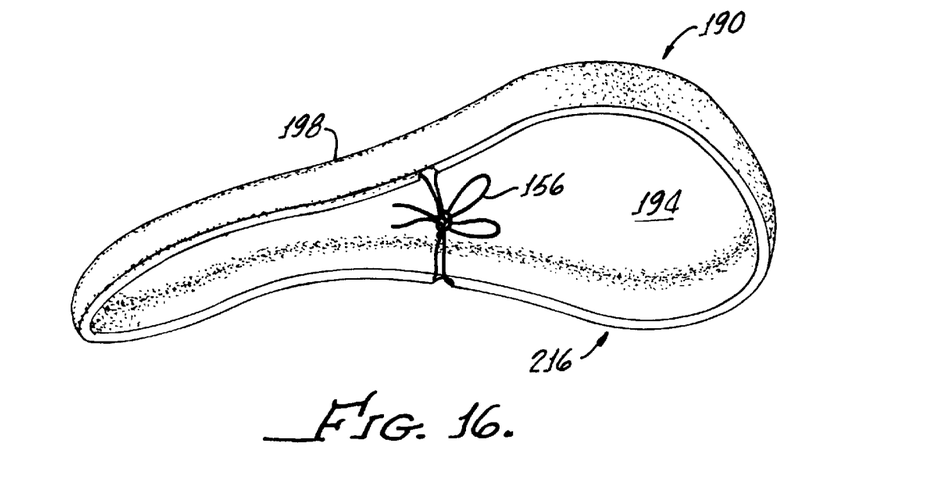
FIG. 16 is a perspective view of an underside of the saddle shown in FIG. 15 showing cinching of the covering to the shell by a draw cord.

FIG. 16 is a perspective view of an underside 216 of the saddle 190 showing the covering 198 cinched to an underside 216 of the shell 194 by drawstrings 156.

Although there has been hereinabove described a particular arrangement of a bicycle saddle with adjustable cushioning in accordance with the present invention, for the purpose of illustrating the manner in which the invention may be used to advantage, it should be appreciated is not limited thereto. Accordingly, any and all modifications, variations or equivalent arrangements which may occur to those skilled in the art, should be considered to be within the scope of the present invention as defined in the appended claims.

What is claimed is:

1. A bicycle saddle comprising:
    a bicycle saddle shell;
    a fabric/film covering;
    an elastomeric cushion disposed between the shell and the covering, the cushion comprising at least a first elastomer and a second elastomer, one of the first and second elastomers having a plurality of cavities and another of the first and second elastomers having a plurality of projections, the cavities and projections being sized and spaced apart from one another to enable engagement therebetween; and
    means for enabling placement and removal of the second elastomer between said fabric/film covering and said shell, said means for enabling placement and removal including drawstring means for cinching the covering about the shell.

2. The bicycle saddle according to claim 1 wherein at least some of the cavities are filled with a collapsible foam.

3. The bicycle saddle according to claim 1 wherein said cavities and projections are, respectively, holes and pins.

4. The bicycle saddle according to claim 1 wherein said first elastomer is attached to said fabric/film covering.

5. The bicycle saddle according to claim 1 wherein the plurality of cavities comprises an array of cavities and the plurality of projections comprises an array of projections, each of the arrays having a different number of cavities and projections enabling different engagement positions between the first and second elastomers.

6. The bicycle saddle according to claim 1 wherein the plurality of cavities and projections are formed in a spaced apart relationship in order to control cushion properties of the saddle.

7. The bicycle saddle according to claim 1 wherein the plurality of cavities are formed with different depths and the projections are formed with different lengths in order to control cushioning properties of the saddle.

8. The bicycle saddle according to claim 1 wherein the covering is attached to a horn portion of the shell and the drawstring means is positioned for cinching the covering about a tail portion of the shell.

9. A bicycle saddle comprising:
    a bicycle saddle shell;
    a fabric/film covering;
    an elastomeric layer adhered to an underside of said fabric/film covering, said fabric/film covering having a plurality of cavities formed therein;
    at least one cushion pad, said cushion pad having a plurality of projections thereon, the projections being sized and spaced in order to engage at least some of the cavities in said elastomeric layer; and
    means for enabling placement and removal of the cushion pad between said fabric/film covering and the shell with the pad projections engaging the cavities in the covering, said means for enabling placement and removal including drawstring means for cinching the covering about the shell.

10. The bicycle saddle according to claim 9 wherein said cavities and projections are, respectively, holes and pins.

11. The bicycle saddle according to claim 9 wherein the plurality of cavities and projections are formed in a spaced apart relationship in order to control cushion properties of the saddle.

12. The bicycle saddle according to claim 9 wherein the plurality of cavities are formed with different depths and the projections are formed with different lengths in order to control cushioning properties of the saddle.

13. The bicycle saddle according to claim 9 wherein the covering is attached to a horn portion of the shell and the drawstring means is positioned for cinching the covering about a tail portion of the shell.

14. The bicycle saddle according to claim 1 wherein said cushion pad comprises a foam material.

* * * * *